(12) United States Patent
Ghyzel

(10) Patent No.: US 8,367,756 B2
(45) Date of Patent: Feb. 5, 2013

(54) STABILIZED COATING DISPERSIONS FOR POROUS INKJET RECORDING MEDIA

(75) Inventor: Peter J. Ghyzel, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 824 days.

(21) Appl. No.: 11/964,987

(22) Filed: Dec. 27, 2007

(65) Prior Publication Data

US 2009/0170980 A1 Jul. 2, 2009

(51) Int. Cl.
C08K 3/36 (2006.01)
C08K 5/02 (2006.01)
C08K 5/053 (2006.01)

(52) U.S. Cl. .......... 524/377; 524/47; 524/52; 524/366; 524/462; 524/493; 524/847

(58) Field of Classification Search .......... 524/366, 524/47, 52, 377, 462, 493, 847; 507/209
See application file for complete search history.

(56) References Cited

U.S. PATENT DOCUMENTS

| | | | |
|---|---|---|---|
| 4,528,106 A * | 7/1985 | Grolitzer | 507/209 |
| 6,779,885 B2 | 8/2004 | Missell et al. | |
| 6,875,563 B2 | 4/2005 | Orem et al. | |
| 2005/0013947 A1 | 1/2005 | Merkel et al. | |
| 2005/0244762 A1 | 11/2005 | Olson et al. | |
| 2006/0083870 A1 | 4/2006 | Chen | |
| 2007/0184216 A1 | 8/2007 | Martin | |
| 2009/0123647 A1 | 5/2009 | Liu et al. | |
| 2009/0123655 A1 | 5/2009 | Shaw-Klein et al. | |
| 2009/0123675 A1 | 5/2009 | Shaw-Klein et al. | |

FOREIGN PATENT DOCUMENTS

WO   WO 2007/100483   9/2007

OTHER PUBLICATIONS

Database WPI Week 200460, Thomson Scientific, London, GB; AN, 2004-618614, XP002516920 & JP 2004 230769 A (Fuji Photo Film Co. Ltd), Aug. 19, 2004, JP Abstract.

* cited by examiner

*Primary Examiner* — Richard A Huhn
(74) *Attorney, Agent, or Firm* — Chris P. Konkol; Andrew J. Anderson

(57) ABSTRACT

The invention relates to an inkjet-recording element comprising a support and at least one coated ink-receiving layer, wherein the ink-receiving layer comprises silica particles, optional hydrophilic polymeric binder, and a combination of surfactants, including a fluorosurfactant and a non-fluorine-containing non-ionic surfactant. Also disclosed is a coating composition for such an inkjet recording element. The invention can provide improved image quality (reduced coalescence) of the inkjet recording element or increased stability of the coating composition.

22 Claims, No Drawings

STABILIZED COATING DISPERSIONS FOR POROUS INKJET RECORDING MEDIA

FIELD OF THE INVENTION

The invention relates to a coating dispersion of fine inorganic particles useful for preparing a layer of an inkjet recording element. More specifically, the invention relates to certain combinations of surfactants capable of stabilizing the particle dispersion. The invention provides for improved manufacturability and improved image quality in the recording element.

BACKGROUND OF THE INVENTION

In a typical inkjet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of water, an organic material such as a monohydric alcohol, a polyhydric alcohol, or mixtures thereof.

An inkjet recording element typically comprises a support having on at least one surface thereof at least one ink-receiving layer. There are generally two types of ink-receiving layers (IRL's). The first type of IRL comprises a non-porous coating of a polymer with a high capacity for swelling and absorbing ink by molecular diffusion. Cationic or anionic substances are added to the coating to serve as a dye fixing agent or mordant for the cationic or anionic dye. This coating is optically transparent and very smooth, leading to a high gloss "photo-grade" receiver. However, with this type of IRL, the ink is usually absorbed slowly into the IRL and the print is not instantaneously dry to the touch.

The second type of IRL comprises a porous coating of inorganic, polymeric, or organic-inorganic composite particles, a polymeric binder, and additives such as dye-fixing agents or mordants. These particles can vary in chemical composition, size, shape, and intra/inter-particle porosity. In this case, the printing liquid is absorbed into the open pores of the IRL to obtain a print that is instantaneously dry to the touch.

A porous inkjet recording element usually contains at least one ink-receiving layer. The layers may be sub-divided or one or more layers may be coated between the support and an uppermost gloss layer. Usually the gloss layer contains fine particles, for example colloidal alumina or colloidal silica. The layers may be coated on a resin coated or a non-resin coated support. The layers may be coated in one or more passes using known coating techniques such as self-metered coating (roll coating, dip coating, rod or blade coating), premetered coating (slot or extrusion coating, slide or cascade coating, or curtain coating) or air knife coating. When coating on a non-resin coated paper, in order to provide a smooth, glossy surface, special coating processes are often utilized, such as cast coating or film transfer coating. Calendering with heat and pressure may also be used to increase gloss.

Recently, higher speed printing has been demanded of inkjet printers. A problem arises when multiple ink droplets are deposited in very close proximity in a short time: if the porosity of the receiver is not adequate, the drops will coalesce, severely degrading the image quality. The amount of binder in the coated layers is relevant, since if too much binder is present, the porosity of the receiver is diminished, resulting in coalescence, and if too little binder is present, unacceptable cracking is observed. Poly(vinyl alcohol) is known as a very effective binder and is frequently employed in porous inkjet recording media. Even though the amount and type of binder may be selected for maximum gloss and best image quality, better performance with regard to coalescence is desired.

Merkel, et al., in US patent application publication 2005/0013947 disclose the use of a fluorosurfactant in an image receiving layer comprising colloidal silica and poly(vinyl alcohol). When the fluorosurfactant weight is between 0.05% and 3.0%, improvements in gloss, dry time, and coalescence are obtained. Preferred fluorosurfactants are non-ionic, linear, perfluorinated polyethoxylated alcohols. One limitation disclosed by Merkel, et al., is that coating compositions comprising the fluorosurfactants should be coated within a period of twelve hours from the time of addition of the fluorosurfactant to the dispersion, in order to avoid excessive agglomeration of the particles resulting in poor gloss. Instability in a coating composition, such as thickening behavior upon standing, is a problem for manufacturing, the risk being that large amounts of the composition may need to be discarded if an interruption in coating causes the composition to age beyond twelve hours after the fluorosurfactant is added. Another risk is that coating quality may change during a coating event as a function of composition age.

Problem to be Solved by the Invention

It is an object of this invention to provide an inkjet receiver with improved color print density, reduced coalescence, and improved gloss while avoiding excessive cracking of the ink-receiving layer. It is a further object of the invention to provide a coating dispersion of fine silica particles useful for preparing one or more layers of an inkjet recording element. It is yet a further object of the invention to provide means of stabilizing such particle dispersions. Furthermore, the use of such dispersions provides for improved manufacturability and improved image quality in the recording element.

SUMMARY OF THE INVENTION

The present invention is directed to overcoming one or more of the problems set forth above. Briefly summarized, according to one aspect of the present invention, there is provided a coating composition comprising a dispersion of fine particles of silica having a particle size of less than 300 nm, hydrophilic hydroxy-containing polymer, a first non-ionic surfactant comprising a per-fluoroalkyl-containing alcohol comprising ethylene oxide repeat units (or perfluoroalkyl ethoxylated alcohol), and a second non-ionic surfactant selected from the group consisting of non-fluorine-containing surfactants that comprises a hydrophobic moiety and a hydrophilic moiety comprising hydroxy groups, wherein the hydroxy number of the second non-ionic surfactant is greater than 300. Also disclosed is an inkjet recording element made from such a coating composition.

Advantageous Effect of the Invention

The present invention has the following advantages: coating compositions of filmed or colloidal anionic silica with an optional binder such as poly(vinyl alcohol) and fluorosurfactants are stabilized by the addition of a non-ionic non-perfluoroalkyl-containing surfactant, such that coating compositions do not increase in viscosity as rapidly as those with a fluorosurfactant alone. Inkjet recording elements made according to the invention can show improved gloss and reduced coalescence.

Other advantages include greater ease of handling precursor dispersions or coating compositions and other improved properties of the resulting inkjet recording element, including improved gloss and reduced cracking for the elements.

In describing the invention herein, the following definitions generally apply:

The term "porous layer" is used herein to define a layer that is characterized by absorbing applied ink substantially by means of capillary action rather than liquid diffusion. The porosity is based on pores formed by the spacing between particles, although porosity can be affected by the particle to binder ratio. The porosity of a layer may be predicted based on the critical pigment volume concentration (CPVC). An inkjet recording element having one or more porous layers, preferably substantially all layers, over the support can be referred to as a "porous inkjet recording element", even if the support is not porous.

Particle sizes referred to herein, unless otherwise indicated, are number weighted median particle sizes. In particular, in the case of colloidal silica, the median particle size is a number weighted median measured by electron microscopy, using high-resolution TEM (transmission electron microscopy) images, as will be appreciated by the skilled artisan. Herein each particle diameter is the diameter of a circle that has the same area as the equivalent projection area of each particle. In the case of colloidal silica, as compared to fumed silica, the colloidal particles may be aggregated on average up to about twice the primary particle diameter, which does not unduly affect the measurement of primary particle size.

In the case of mixtures of two populations of particles, the median particle size of the mixture is merely the median particle size of the mixture. Typically, for equal weights of two median particle sizes in a mixture, the median particle size of the mixture is relatively closer to the median particle size of the component having the smaller median particle size.

It is difficult to measure the secondary size of fumed metal oxide particles because the methods commonly used treat the particles as spheres and the results are calculated accordingly. (The primary particle size of fumed silica in dispersion can be measured by TEM, as with colloidal silica.) Fumed silica particles are not spheres but consist of aggregates of primary particles. In the case of fumed silica, the median secondary particle size is as determined by light scattering measurements of diluted particles dispersed in water, as measured using laser diffraction or photon correlation spectroscopy (PCS) techniques employing NANOTRAC (Microtac Inc.), MALVERN, or CILAS instruments or essentially equivalent means. Unless otherwise indicated, particle sizes refer to secondary particle size. The median particle size of inorganic particles in various products sold by commercial manufacturers is usually provided in the product literature. However, for the purpose of making accurate comparisons among products, the particular measurement technique may need to be taken into consideration. Use of a single testing method eliminates potential variations among different testing methods.

As used herein, the terms "over", "above", "upper", "under", "below", "lower", and the like, with respect to layers in inkjet media, refer to the order of the layers over the support, but do not necessarily indicate that the layers are immediately adjacent or that there are no intermediate layers.

In regard to the present invention, the term "image-receiving layer" is intended to define a layer that is used as a pigment-trapping layer, dye-trapping layer, or dye-and-pigment-trapping layer, in which the printed image substantially resides throughout the layer. In the case of a dye-based ink, the image may optionally reside in more than one adjacent image-receiving layer.

In regard to the present invention, the term "gloss layer" is intended to define the uppermost coated layer in the inkjet recording element that provides additional gloss compared to the base layer alone. It is an image-receiving layer.

In regard to the present invention, the term "base layer" (sometimes also referred to as a "sump layer" or "ink-carrier-liquid receptive layer") is used herein to mean a layer under at least one other ink-retaining layer that absorbs a substantial amount of ink-carrier liquid. In use, a substantial amount, preferably most, of the carrier fluid for the ink is received and remains in the base layer until dried. The base layer is not above an image-receiving layer and is not itself an image-containing layer (a pigment-trapping layer or dye-trapping layer), although relatively small amounts of the ink colorant, in the case of a dye, may leave the image-receiving layer and enter the base layer, mostly in an upper portion. Preferably, the base layer is the ink-retaining layer nearest the support, with the exception of subbing layers. The base layer, if present is usually the thickest layer under the image-receiving layer or layers.

The term "subbing layer" refers to any layer between the base layer and the support having a dry weight of less than 5 $g/m^2$, preferably less than 1 $g/m^2$. The subbing layer may be porous or non-porous and may be used to improve adhesion or accomplish some other function such as providing a crosslinking agent for diffusion.

The term "ink-receptive layer" or "ink-retaining layer" includes any and all layers above the support that are receptive to an applied ink composition, that absorb or trap any part of the one or more ink compositions used to form the image in the inkjet recording element, including the ink-carrier fluid and/or the colorant, even if later removed by drying. An ink-receptive layer, therefore, can include an image-receiving layer, in which the image is formed by a dye and/or pigment, a base layer, a subbing layer, or any additional layers, for example between a base layer and a topmost layer of the inkjet recording element. Typically, all layers above the support are ink-receptive. The support on which ink-receptive layers are coated may also absorb ink-carrier fluid. Whereas an ink-receptive layer is coated onto a support, the support is a solid material over which all the ink-receptive layers are coated during manufacture of the inkjet recording element.

DETAILED DESCRIPTION OF THE INVENTION

Fumed or pyrogenic silica refers to synthetic amorphous silica produced by continuous flame hydrolysis of silicon tetrachloride. This process produces very fine particles having primary particle sizes of 7 to 40 nm and that have surface areas ranging from 90 to 300 $m^2/g$. These particles may only be dispersed to the level of aggregates which have secondary particle sizes on the order of 100 nm or greater. The aggregate nature of these particles creates porosity that makes them useful in instant dry inkjet media. See, for example, "Fine Particles Number 11 Basic Characteristics of Aerosil Fumed Silica" published by Degussa Corporation.

Colloidal silica refers to silica produced by precipitation. The aqueous dispersions are generally fine particles (average particle size less than 100 nm). They are dispersed as primary particles, and therefore are not intrinsically porous. They can, however, be dispersed at higher solids than comparative fumed silica.

In a preferred embodiment of the present coating compositions and inkjet recording elements made therewith, the particles of silica exhibit a zeta potential below negative 15 mv, inclusive of fumed or colloidal silica.

Surfactants are useful in the manufacture of inkjet receivers. The coating processes used require reduced surface tension to enable wetting and spreading of the coating dispersion on the coating support. The presence of surfactants in the inkjet receiver can also improve the interaction of the receiver with inkjet inks thus enhancing the image quality.

A particularly useful class of surfactants are fluorosurfactants such as Zonyl® FSO, FSN, and FS-300 that are produced by DuPont. The use of these surfactants enables high gloss in porous inkjet receivers formulated from silica.

Unfortunately, coating dispersions prepared from colloidal or fumed silica, polyvinylalcohol, and fluorosurfactants are not stable. These dispersions viscosity with time and in extreme conditions they will gel.

We have discovered that the stability of these dispersions is improved by including certain nonionic surfactants in addition to the fluorosurfactant in the formulation. The nonionic surfactants that are useful have a relatively high proportion of hydroxyl groups in a hydrophilic portion of the surfactant molecule.

Surfactants are surface-active molecules that usually include polar and non-polar moieties. They tend to locate themselves at interfaces where the polarity is not matched. To minimize the surface energy component of the Gibbs Free Energy, the non-polar portion of the molecule will align itself with the less polar surface (or solvent) and the polar portion of the molecule will align itself with the more polar surface or solvent.

In general, a wide variety of non-ionic surfactants are known and include, for example, alkyl poly(ethylene oxide)s, alkyl copoly(ethylene oxide and propylene oxide)s, alkyl poly(glycidol)s, alkyl poly(glucosides), and fatty alcohols.

A useful way to characterize nonionic surfactants in this invention is by using the hydroxyl number The hydroxyl number is defined as follows:

Hydroxyl number=56,100/(equivalent weight in g for one mole of hydroxyl)

For coating dispersion formulated from colloidal or fumed silica, hydrophilic hydroxy-containing polymers, and fluorinated surfactants, we have found that the addition of non-ionic surfactants with a hydroxyl number 300 or greater improves the stability of the dispersion. To have a hydroxyl number of 300 or greater requires a surfactant molecule with multiple hydroxyl moieties. General classes of nonionic surfactants that meet these criteria include, for example, alkyl poly(glycidol)s and alkyl poly(glucosides). The following Table A shows various known surfactants and their hydroxy number.

TABLE A

| Surfactant/Compound | OH number | Utility |
|---|---|---|
| Triton X-100 ® | 90 | Comparative |
| Tergitol 15-S-7 ® | 110 | Comparative |
| Tergitol 15-S-3 ® | 171 | Comparative |
| Tergitol TMN-3 ® | 181 | Comparative |
| Surfactant 10G ® | 642 | Inventive |
| APG ® | 801 | Inventive |
| Butanol | 758 | Comparative Non-Surfactant |
| Ethylene Glycol | 1870 | Comparative Non-Surfactant |

Regarding the non-ionic fluorosurfactant of the present invention, there are a number of different types of fluorosurfactants that can be used. Examples of such fluorosurfactants include, but are not limited to, surfactants having the tradenames Zonyl® (from E. Is DuPont de Nemours and Co.). In a preferred embodiment of the invention, the fluorosurfactant is Zonyl® FSO, Zonyl® FSN, or Zonyl° FS-300, which are nonionic linear perfluorinated polyethoxylated alcohols represented by the following formulas wherein x<y<z and x, y, and z are between 0 and 25 and wherein the distribution of the perfluoroethylene units in the perfluorinated portion of the four surfactants is different as indicated by the following structures:

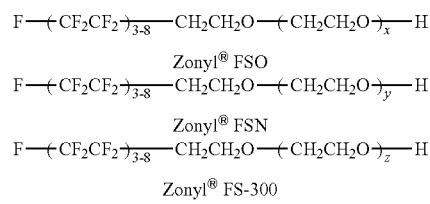

Image-recording elements prepared with these three Zonyl® fluorosurfactants have excellent performance in terms of dry time, gloss, and image quality.

In one embodiment of the present invention, the non-fluorine-containing co-surfactant is a non-ionic surfactant represented by the following structure (I):

$$R_1(M)_n R_2 \quad (I)$$

wherein $R_1$ is a hydrophobic organic group having 6 to 24 carbon atoms, for example, a substituted or unsubstituted alkyl, aryl, alkylaryl, or other hydrophobic group having 8 to 20 carbon atoms; M is a repeat unit with at least one hydroxyl group, such as a monomeric repeat unit of glycidol, organic polyglycidyl, carbohydrates such as glucose or glucosides, and the like; $R_2$ is an terminal end group for the repeat units or hydrogen, and n is on average between 1 and 20. Preferably, $R_1$ is hydrocarbon with 8 to 20 carbons, more preferably alkyl or alkylaryl. M is preferably a product of glycidol or glucose, and n is on average between about 1 and 10. In one embodiment, $R_1$ is a hydrocarbon with 8 to 20 carbons optionally containing an ether linkage.

For example, the water soluble surface active agents may be chosen from the several classes of surfactants, as described below:

A first class of surfactants are water soluble surfactants comprising a 6 to 22 carbon atom hydrophobic tail with one or more attached hydrophilic chains comprising at least 8 repeat units of glycidyl-containing monomers.

Such as surfactant can be represented by the following structure (II):

$$R_3-O-(M)_n-H \quad (II)$$

$R_3$ is as defined above for $R_1$, preferably a hydrophobic substituted or unsubstituted alkyl or alkylaryl group with 8 to 20 carbons;

n is on average between about 1 and 20, preferably 5 to 15;

M is alkyl group containing at least one hydroxyl group, as above, such as a repeat unit of glycidol or the like.

A preferred example of such a surfactant can be represented by the following structure (III):

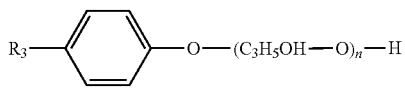

$$R_3-\phenyl-O-(C_3H_5OH-O)_n-H \quad (III)$$

wherein n is as described above and $R_3$ is a hydrophobic organic moiety as defined above. It should be noted that, in the above formula, the repeat units are made from the reaction product of glycidol reacting with an hydrophobic moiety, such as alkylphenol, yielding an average number of glycidyl units per molecule, typically having a distribution of glycidyl units, including possibly a significant amount of polyglycidol that may not be combined/reacted with the hydrophobic moiety. Although some of the repeat units have a —$CH_2OH$ group pendant to the chain, it should be understood that the structure also represents the alternative repeat unit of glycidol in which the repeat unit is a —$CH_2$—$CH(OH)$—$CH_2$—O— unit, Specific examples of such cosurfactants useful in the present invention are shown below, which is Surfactant 10G® (Dixie Corp.):

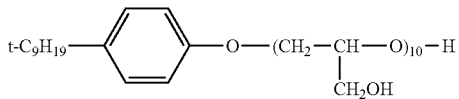

$$t-C_9H_{19}-\phenyl-O-(CH_2-CH(CH_2OH)-O)_{10}-H$$

In addition, the present invention relates to water soluble alkylpolyglycoside surfactants, for example, represented by the following Structure IV:

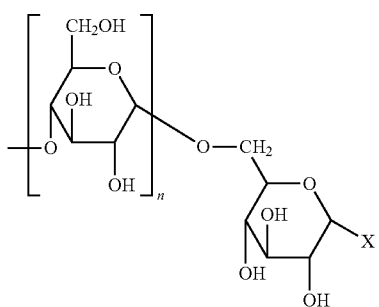

(IV)

wherein n is on average 0 to 3 carbohydrate units, and X represents $R_4$, $OR_4$, $SR_4$, or $N(R_4)(R_5)$, wherein $R_4$ is a substituted or unsubstituted hydrophobic organic moiety containing one or more functional groups selected from the group consisting of carboxamide, ketone, sulfone, sulfoxide, sulfonamide, urea, phosphate ester, carboxylic ester, or a branched and unbranched alkyl, aryl, alkenyl, arylalkyl, carbocyclic, or heterocyclic group; and $R_5$ is independently selected from the group consisting of a hydrogen atom or an $R_4$ group.

Many groups fit under this description of X, but in a particularly useful embodiment, X represents a group $OR_4$, where $R_4$ is a linear alkyl chain with an average length comprising 8 or more carbons, more preferably 10 or more carbons, and most preferably 12 or more carbons. Examples of this class of surfactant useful in the present invention, wherein X represents a group $OR_1$ is shown in Table B below.

TABLE B

| ID | Manufacturer | Carbons in $R_1$ | Average number of carbohydrate units, n |
|---|---|---|---|
| D-1 | Glucopon 425 ® (Henkel) | 8, 10, 12, 14, 16 | 1.5 |
| D-2 | Glucopon 600 ® (Henkel) | 12, 14, 16 | 1.4 |
| D-3 | Glucopon 625 ® (Henkel) | 12, 14, 16 | 1.6 |

In addition, the present invention relates to water soluble alkyl polyglycoside surfactant represented by the following general Structure V:

$$R_6O(C_nH_{2n}O)_y(Z)_x \quad (V)$$

wherein $R_6$ is a hydrophobic organic group (e.g., alkyl, aryl, alkylaryl, and the like, including branched or unbranched, saturated and unsaturated, and hydroxylated or alkoxylated members of the foregoing, among other like groups) containing from 6 to 30 carbon atoms, preferably from 8 to 15 carbon atoms, and more preferably from 9 to 13 carbon atoms; n is a number from 2 to 4, preferably 2 (thereby giving corresponding units such as ethylene, propylene and butylene oxide); y is a number having an average value of from 0 to about 12, preferably 0; Z is a moiety derived from a reducing saccharide containing 5 or 6 carbon atoms (e.g., a glucose, fructose, mannose, galactose, talose, gulose, allose, altrose, idose, arabinose, xylose, lyxose, or ribose unit, etc., but most preferably a glucose unit); and x is a number having an average value of from 1 to about 10, preferably from 1 to about 5, and more preferably from 1 to about 3.

It would be apparent that a number of variations with respect to the makeup of such glycosides of Structure V are possible. For example, mixtures of saccharide moieties Z) may be incorporated into polyglycosides. Also, the hydrophobic group $R_6$ can be attached at the various positions of a saccharide moiety in addition to the 1-position (thus giving, for example, what can also be referred to as a glucosyl). In addition, normally free hydroxyl groups of the saccharide moiety may be alkoxylated or polyalkoxylated. Further, the $R_6O(C_nH_{2n}O)_y(Z)_x$ group may include ethylene oxide and propylene oxide in random or block combinations, among a number of other possible variations.

An especially preferred glycoside surfactant is APG 325N®, which is manufactured by the Henkel Corporation. APG 325N® is a nonionic alkyl polyglycoside in which R is a mixture of C9, C 10 and C11 chains in a weight ratio respectively of 20:40:40 (equivalent to an average of C10. 2), with x of 1.6, and an HLB of about 13.

Examples of other surfactants of the above classes are set forth in "McCutcheon's", Vol. 1, "Emulsifiers and Detergents", International Edition and North American Edition, McCutcheon's Division of the Manufacturing Confectioner Publishing Co., N.J. (1991), incorporated herein by reference, which surfactants may be used according to the present invention requirements.

In the above structures, unless otherwise specifically stated, use of the term "substituted" or "substituent" means any group or atom other than hydrogen. Additionally, when the term "group" is used, it means that when a substituent group contains a substitutable hydrogen, it is also intended to encompass not only the substituents unsubstituted form, but also its form to the extent it can be further substituted (up to the maximum possible number) with any other mentioned substituent group or groups (mentioned for the same position)

so long as the substituent does not destroy properties necessary for surfactant utility. If desired, the substituents may themselves be further substituted one or more times with acceptable substituent groups. For example, an alkyl group can be substituted with an alkoxy group or a hydroxy group. When a molecule may have two or more substituents, the substituents may be joined together to form an aliphatic or unsaturated ring unless otherwise provided.

In a preferred embodiment of the invention, the fluorosurfactant is present in an ink-receiving layer in an amount between 0.03% and 5% by weight of the ink-receiving layer or of solids in the coating composition. When the fluorosurfactant is present in an amount less than 0.03% by weight, the gloss of the image-receiving layer is less than desired and the dry time is longer than desired. When the fluorosurfactant is present is an amount greater than 5% by weight, the dry time is longer than desired and some image quality attributes such as bleed and coalescence can be negatively impacted. In a more preferred embodiment, the fluorosurfactant comprises between 0.05% and 3% by weight of said image-receiving layer or solids in the coating compositions. Image-recording elements prepared with fluorosurfactants within this range have the best performance in terms of gloss, dry time, and image quality.

In a preferred embodiment of the invention, the second non-ionic non-fluorine-containing surfactant ("cosurfactant") is present in an ink-receiving layer in an amount between 0.03% and 5% by weight of the ink-receiving layer or of solids in the coating composition. When the cosurfactant is present in an amount less than 0.03% by weight, the stability of composition is less than desired. In a more preferred embodiment, the cosurfactant comprises between 0.05% and 3% by weight of said image-receiving layer or solids in the coating compositions. The ratio (by weight) of the cosurfactant to the fluorosurfactant is preferably 0.1 to 5, more preferably 0.2 to 2.

The surfactants of the invention are normally incorporated into the image-receiving layer by adding them as aqueous or alcoholic solutions to a coating composition of colloidal silica, preferably anionic silica, hydrophilic binder, and other optional compatible materials, which may be added to enhance particular performance aspects dependent upon the end use. While the order of addition of the various components to the coating composition is not particularly important to obtain the advantages of the invention, it is somewhat preferred to add the non-fluorine-containing co-surfactant prior to adding the fluorosurfactant to a coating composition comprising anionic colloidal silica and hydrophilic binder. Once the fluorosurfactant is added to the coating composition, it is important that the coating composition is applied to the surface of the support within a period of time not less than 2 minutes and not greater than 48 hours. If the fluorosurfactant-containing coating composition is applied to the surface of the support sooner than a 2-minute hold time or later than 48-hour hold time, the advantages of the invention may not be met. It is thought that a hold time shorter than 2 minutes does not allow sufficient time for the processes of fluorosurfactant adsorption to the surfaces of the silica particles and subsequent agglomeration of such particles to occur, which results in low porosity. Furthermore, a hold time greater than 48 hours causes excessive agglomeration of such particles to occur, which results in low gloss. In a preferred embodiment of the invention, the coating composition is applied to the surface of the support within a time period not less than 5 minutes and not greater than 24 hours after the fluorosurfactant is added to the coating composition as this provides image-recording elements with the best gloss.

As indicated above, the dispersions of the present invention are useful in the preparation or manufacture of a porous inkjet recording element comprising, including for example, over the support, a porous base layer nearest the support, and a porous uppermost gloss layer. The porous base layer nearest the support and porous upper gloss layer may optionally be divided into sub-layers, preferably immediately adjacent sub-layers, in which case independently the sub-layers individually and collectively meet the claim limitations of the layer, except for the thickness limitations. The layers, described herein, are preferably coated as a single layer.

In one embodiment, the inkjet recording element consists of a single porous base layer and a single upper gloss layer over the support, with the possible exception of layers less than 1 micrometer thick such as subbing layers.

In a preferred embodiment, the 20-degree gloss of the unprinted inkjet recording element is at least 15 Gardner gloss units, preferably at least 20 Gardner gloss units.

In one preferred embodiment, the dispersions of the present invention can be used for making an inkjet recording element comprising, in order:

(a) a porous base layer comprising particles of anionic fumed silica, and hydrophilic hydroxyl-containing polymer as the primary binder, wherein the base layer has a dry weight of about 10 to 35 $g/m^2$, preferably 15 to 25 $g/m^2$, wherein the hydrophilic hydroxyl-containing polymer is crosslinked with crosslinker comprising boron-containing compound, wherein the weight percent of total binder to total solids in the base layer is greater than 5.0 percent and less than 15.0 percent, preferably less than 12 percent, most preferably less than 10 percent; and (b) a porous gloss layer above the base layer comprising particles of anionic colloidal silica and a hydrophilic binder and having a dry weight of about 1.0 to 7.5 $g/m^2$, wherein the median particle size of the particles of anionic colloidal silica is about 10 to less than 120 nm, preferably less than 40 nm, advantageously in some embodiments less than 30 nm, more preferably less than 25 nm.

Such inkjet recording elements are disclosed in commonly assigned, US Publication Numbers 2009/0123647, 2009/0123655, and 2009/0123675 to Romano et al., hereby incorporated by reference in their entirely. Other inkjet recording elements in the art to which the present coating compositions may be applicable would be readily appreciated by the skilled artisan.

Colloidal silica particles for use in the present coating compositions and inkjet recording elements may be further characterized by surface area BET surface measurement The preferred surface area for the colloidal silica particles, particularly in a gloss layer, is above 50 $m^2/g$. Relatively larger surface areas among different colloidal silica products tend to be associated with smaller diameter particles. As used herein, the BET surface area measurement relies on the nitrogen adsorption method of S. Brunauer, P. H. Emmet and I. Teller, *J. Am. Chemical Society*, vol. 60, page 309 (1938).

As mentioned above, the amount of binder in an ink-receiving layer is desirably limited, because when ink is applied to inkjet media, the (typically aqueous) liquid carrier tends to swell the binder and close the pores and may cause bleeding or other problems. Preferably, therefore, the base layer comprises a less than an maximum amount of binder in the base layer, to maintain the desired porosity, preferably above a minimum amount of binder sufficient to prevent or eliminate cracking and other undesirable properties.

Any suitable hydrophilic hydroxyl-containing polymer, preferably crosslinkable by a boron-containing compound may be used as the primary binder in the coating compositions of the present invention for use in one or more layers of an inkjet recording element.

A crosslinkable hydrophilic hydroxyl-containing polymer useful in the base layer may be, for example, poly(vinyl alcohol), partially hydrolyzed poly(vinyl acetate/vinyl alcohol), or copolymers containing hydroxyethylmethacrylate, copolymers containing hydroxyethylacrylate, copolymers containing hydroxypropylmethacrylate, hydroxy cellulose ethers such as hydroxyethylcellulose, etc. In a preferred embodiment, a crosslinkable polymer containing hydroxyl groups is poly(vinyl alcohol), including partially hydrolyzed poly(vinyl acetate/vinyl alcohol) or modified or unmodified PVA, or a copolymer of PVA comprising primarily (more than 50 mole percent) monomeric repeat units containing a hydroxy group, more preferably at least 70 mole percent of such monomeric repeat units.

In general, particularly good results are obtained employing, as the primary binder, poly(vinyl alcohol), also referred herein as "PVA." As indicated above, the term "poly(vinyl alcohol)" includes modified and unmodified poly(vinyl alcohol), for example, acetoacetylated, sulfonated, carboxylated PVA, and the like. Copolymers of PVA, for example with ethylene oxide, are also preferred as primary binder.

The poly(vinyl alcohol) preferably employed includes common poly(vinyl alcohol), which is prepared by hydrolyzing polyvinyl acetate, and also modified poly(vinyl alcohol) such as poly(vinyl alcohol) having an anionic or non-cationic group.

In one embodiment, the average degree of polymerization of the poly(vinyl alcohol) prepared by hydrolyzing vinyl acetate is preferably at least 300, but is more preferably 1000 to 10,000, or a preferred viscosity of at least 25 cP, more preferably at least 40 cP in water at a concentration of 4 percent by weight at 20° C. The saponification ratio of the poly(vinyl alcohol) is preferably 70% to 100%, but is more preferably 75% to 95%.

Lesser amounts of supplemental non-hydrophilic (hydrophobic) binders may also be included in various compositions. Preferred polymers are water-soluble, but latex polymer can also be included for various reasons. (As used herein, the term "primary" refers to greater than fifty percent by weight of all binder.)

In a preferred embodiment, the supplemental polymeric binder, if different from the primary binder, may be a compatible, preferably water-soluble hydrophilic polymer such as poly(vinyl pyrrolidone), gelatin, cellulose ethers, poly(oxazolines), poly(vinylacetamides), poly(acrylic acid), poly(acrylamide), poly(alkylene oxide), sulfonated or phosphated polyesters and polystyrenes, casein, zein, albumin, chitin, chitosan, dextran, pectin, collagen derivatives, collodian, agar-agar, arrowroot, guar, carrageenan, tragacanth, xanthan, rhamsan, methyl cellulose, hydroxypropyl cellulose, hydroxypropyl methyl cellulose, poly(2-ethyl-2-oxazoline), poly(2-methyl-2-oxazoline), poly(alkylene oxide), poly(vinyl pyrrolidinone), poly(vinyl acetate), polyarethanes, vinyl acetate-ethylene copolymers, ethylene-vinyl chloride copolymers, vinyl acetate-vinyl chloride-ethylene terpolymers, acrylic, polymers, copolymers or derivatives thereof and the like, or combinations thereof.

Preferred hydrophobic materials can include, for example, poly(styrene-co-butadiene), polyurethane latex, polyester latex, poly(n-butyl acrylate), poly(n-butyl methacrylate), poly(2-ethylhexyl acrylate), copolymers of n-butylacrylate and ethylacrylate, copolymers of vinylacetate and n-butylacrylate, and the like. Mixtures of hydrophilic and latex binders may be useful, for example, mixtures of poly(vinyl alcohol) and poly(styrene-co-butadiene) latex.

With respect to a boron-containing crosslinker, most preferably, a boron-containing compound such as borate or borate derivative, may be contained in a subbing layer so that it diffuses into one or more coated layer to crosslink the crosslinkable binder.

A borate or borate derivative employed in a subbing layer of the ink jet recording element can be, for example, borax, sodium tetraborate, and the like, preferably not an acidic boron-containing compound such as boric acid.

In one embodiment, the crosslinking compound is a borate salt such as sodium tetraborate decahydrate (borax), sodium borate, and derivatives of boric acid, boric anhydride, and the like, employed in combination with, as binder in the base layer, a poly(vinyl alcohol), that is, "PVA."

It is known that PVA and borax interact to form a high viscosity or gelled mixture in solution that forms a crosslinked coating on drying. According to one embodiment, therefore, borax is pre-coated on a web and then an aqueous coating composition according to the present invention is applied. The water from the coating composition solubilizes the borax, thus allowing it to diffuse through the coating, quickly thickening the composition.

The optional boron-containing compound, for example, the borate or borate derivative, is preferably used in an amount in a subbing layer of up to about twenty percent of the weight of the binder in the base layer. It is believed that upon coating of the base layer over such a dried subbing layer, most of the borate or borate derivative in the subbing layer diffuses into the base layer to crosslink most of the binder in the base layer, since such diffusion is typically rapid.

In order to impart further mechanical durability to the base layer, in another embodiment of the invention, one or more supplemental, non-boron-containing crosslinkers that act upon the binder discussed above may be optionally added in small quantities to the present coating composition. Such an additive can further improve the cohesive strength of the layer. Crosslinkers such as carbodiimides, polyfunctional aziridines, aldehydes, isocyanates, epoxides, vinyl sulfones, pyridinium, pyridylium dication ether, methoxyalkyl melamines, triazines, dioxane derivatives, chrom alum, zirconium sulfate, and the like may be used. Thus, a non-boron-containing crosslinker can be used in combination with a boron-containing crosslinker for use with respect to the present coating compositions.

In one embodiment, an inkjet recording element comprises a porous base layer, made using the present coating composition, comprising particles of anionic fumed silica and hydrophilic hydroxyl-containing polymer as the primary binder crosslinked with crosslinker comprising boron-containing compound, wherein the porous base layer has a dry weight of about 10 to 35 g/m$^2$, and wherein the weight percent of total binder to total solids in the porous base layer is greater than 5.0 percent and less than 15.0 percent.

In such an embodiment, the base layer is located under one or more other porous ink-retaining layers, at least the gloss layer, and absorbs a substantial amount of the liquid carrier applied to the inkjet recording element, but substantially less dye or pigment, if any, than the overlying layer or layers.

The inorganic particles in the coating compositions of the present invention can comprise a mixture of two different populations of different silica particles that are separately made and then admixed.

Preferably, the coating compositions comprises at least about 70 percent, more preferably at least about 90 percent, by weight of silica particles, based on the total weight of inorganic particles in the coating composition.

The present coating compositions may further comprise a minor amount of one or more other inorganic particles in addition to the silica, if any, for example, titanium oxide, tin oxide, zinc oxide, and the like, and/or mixtures thereof. Examples of other useful inorganic particles include clay and calcium carbonate.

In addition to the inorganic particles mentioned above, the present coating compositions can independently contain organic particles or beads such as poly(methyl methacrylate), polystyrene, poly(butyl acrylate), etc. Preferably, substantially all the particles in the coating compositions have a median primary or secondary particle size of not more than 300 nm.

Preferably, the silica particles comprise particles of a silicon-oxide containing material in which at least 70 percent, preferably at least 80 percent, of the metal or silicon atoms are silicon, in combination with oxygen or other non-metallic or metallic atoms. For example, various dopants, impurities, variations in the composition of starting materials, surface agents, and other modifying agents may be added to the silicon oxide in limited amounts during its preparation, as long as the resulting surface is anionic. Fumed silica, for example, can include mixed metal oxides, as long as the zeta potential requirements are met. See, for example, U.S. Pat. No. 7,015,270 to Scharfe et al. and U.S. Pat. No. 6,808,769 to Batz-Sohn et al., both hereby incorporated by reference. Silicon-oxide-mixed oxide particles can include, for example, titanium, aluminum, cerium, lanthanum, or zirconium atoms. Mixed oxides include intimate mixtures of oxide powders at an atomic level with the formation of mixed oxygen-metal/non-metal bonds.

As indicated above, silicon-oxide particles can be divided roughly into particles that are made by a wet process and particles made by a dry process (vapor phase process). The latter type of particles is also referred to as fumed or pyrogenic particles. In a vapor phase method, flame hydrolysis methods and arc methods have been commercially used. The term "flame hydrolysis" is understood to mean the hydrolysis of metal or non-metal compounds in the gas phase of a flame, generated by reaction of a fuel gas, preferably hydrogen, and oxygen. Highly disperse, non-porous primary particles are initially formed which, as the reaction continues, coalesce to form aggregates, and these aggregates may congregate further to form agglomerates. In a preferred embodiment, the BET surface of area of these primary particles is 5 to 600 $m^2/g$. Fumed silica is produced in a vapor phase process, whereas colloidal silica is not and can be distinguished from both fumed silica made by a dry process and other silicas made by a wet process such as relatively more porous silica gel.

Fumed particles exhibit different properties than non-fumed or wet-process particles, which are referred to herein as "colloidal silica". In the case of fumed silica, this may be due to the difference in density of the silanol group on the surface. Fumed particles are suitable for forming a three-dimensional structure having high void ratio.

Fumed or pyrogenic particles are aggregates of smaller, primary particles. Although the primary particles are not porous, the aggregates contain a significant void volume, and hence are capable of rapid liquid absorption. These void-containing aggregates enable a coating to retain a significant capacity for liquid absorption even when the aggregate particles are densely packed, which minimizes the inter-particle void volume of the coating. For example, famed silica, for selective optional use in the present invention, is described in U.S. Pat. No. 6,808,769 to Batz-Sohn et al., U.S. Pat. No. 6,964,992 to Morris et al. and U.S. Pat. No. 5,472,493 to Regan, all hereby incorporated by reference. Examples of famed silica are provided in the Examples below and are commercially available, for example, from Cabot Corp. under the family trademark CAB-O-SIL silica, or Degussa under the family trademark AEROSIL silica.

Fumed silicas having relatively lower surface area are preferred for their lower binder requirement, but fumed silicas with surface areas that are too low decrease gloss. In one embodiment, a range of 150 to 350 $m^2/g$ is preferred, more preferably 170 to 270 $m^2/g$.

The term "colloidal silica" refers to particles comprising silicon oxide that are dispersed to become colloidal. Such colloidal particles characteristically are primary particles that are substantially spherical. Larger particles, aggregates of primary particles relatively limited in number and aggregation, may be present to a minor extent, depending on the particular material and its monodispersity or polydispersity, but the larger particles have relatively minor effect on the number weighted median particle size. Examples of these colloidal silica are described in the Examples below and are commercially available from a number of manufacturers, including Nissan Chemical Industries, Degussa, Grace Davison (for example under the family trademarks SYLOJET and LUDOX), Nalco Chemical Co., etc. Typically, colloidal silica naturally has an anionic charge, resulting from the loss of protons from silanol groups present on the particles' surface. Such particles typically originate from dispersions or sols in which the particles do not settle from dispersion over long periods of time. Most commercially available colloidal silica sots contain sodium hydroxide, which originates at least partially from the sodium silicate used to make the colloidal silica.

Conventional additives may be included in the coating compositions or resulting ink-receiving layers according to the present invention, which may depend on the particular use for the recording element. Such additives that optionally can be included in the ink-receiving layers of the inkjet recording element include cross-linkers, rheology modifiers, surfactants, UV-absorbers, biocides, lubricants, dyes, optical brighteners, and other conventionally known additives. Additives may be added in light of the fact that the inkjet recording element may come in contact with other image recording articles or the drive or transport mechanisms of image-recording devices, so that additives such as matte particles and the like may be added to the inkjet recording element to the extent that they do not degrade the properties of interest. Also the additives must be compatible with anionic silica.

The inkjet recording element can be specially adapted for either pigmented inks or dye-based inks, or designed for both. In the case of pigment-based inks, an upper gloss layer can function as a pigment-trapping layer. In the case of dye-based inks, both an upper gloss layer and a lower base layer, or an upper portion thereof, may contain the image, depending on the particular embodiment, thickness of the layers, particle composition, binder, etc.

The support for the coated ink-retaining layers may be selected from plain papers or resin-coated paper. Preferably the resin-coated paper comprises a polyolefin coating on both sides, more preferably polyethylene. The thickness of the support employed in the invention can be from about 12 to about 500 µm, preferably from about 75 to about 300 µm.

If desired, in order to improve the adhesion of the base layer to the support, the surface of the support or a subbing layer may be corona-discharge-treated prior to applying the base layer to the support.

The inkjet recording element of the present invention can be manufactured by conventional manufacturing techniques known in the art. In a particularly preferred method, the subbing layer is coated in a single layer at a single station and all the additional coating layers, comprising the base and gloss layers, are simultaneously coated in a single station. In one embodiment, the entire inkjet recording element is coated in a single coating pass.

The term "single coating pass" or "one coating pass" refers to a coating operation comprising coating one or more layers, optionally at one or more stations, in which the coating operation occurs prior to winding the inkjet recording material in a roll. A coating operation, in which a further coating step occurs before and again after winding the inkjet recording material on a roll, but prior to winding the inkjet recording material in a roll a second time, is referred to as a two-pass coating operation.

In one embodiment, a plurality of ink-receiving layers are simultaneously coated, preferably by curtain coating.

In one preferred embodiment, the method of manufacturing an inkjet recording element comprises the steps of:
  (a) providing a support;
  (b) simultaneously coating in order over the support;
    (i) a first coating composition, for a base layer, according to the present invention, comprising particles of anionic fumed silica and a hydrophilic binder capable of being substantially cross-linked by crosslinking compound not contained in the first composition; and
    (ii) a second coating composition, for a gloss layer, according to the present invention, comprising particles of anionic colloidal silica and a binder;
  (c) treating the support prior to step (b) with a subbing composition comprising a crosslinking compound that diffuses into at least the base layer to substantially crosslink at least the hydrophilic binder in the base layer.

The subbing composition can optionally comprise a binder or may simply comprise a liquid carrier such as water.

The binder in the gloss layer can also be capable of being substantially cross-linked by crosslinking compound not contained in the second composition and wherein said crosslinking compound also diffuses into the gloss layer to substantially crosslink the binder in the gloss layer.

Thus, in one embodiment, the support is treated prior to step (b) with a subbing composition comprising a crosslinking compound that diffuses into at least the base layer to substantially crosslink at least the hydrophilic binder in the base layer. In this case, the crosslinking compound may migrate to some extent into the upper gloss layer, depending on various factors such as the thickness of the base layer.

Further intermediate layers between the base layer and the upper gloss layer, etc. may be coated by conventional premetered coating means as enumerated above. Preferably, the base layer and the gloss layer are the only two layers having a dry weight over 1.0 g/m$^2$ in the ink-receiving element.

Inkjet inks used to image the recording elements of the present invention are well known in the art. The ink compositions used in inkjet printing typically are liquid compositions comprising a solvent or carrier liquid, dyes or pigments, humectants, organic solvents, detergents, thickeners, preservatives, and the like. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols. If dyes are used in such compositions, they are typically water-soluble direct or acid type dyes. Such liquid compositions have been described extensively in the prior art including, for example, U.S. Pat. Nos. 4,381,946; 4,239,543; and 4,781,758.

Typically the colorants used in inkjet printing are anionic in character. In dye based printing systems, the dye molecules contain anionic moieties. In pigment based printing systems, the dispersed pigments are functionalized with anionic moieties. Colorants must be fixed near the surface of the inkjet receiver in order to provide the maximum image density. In the case of pigment based printing systems, the inkjet receiver is designed with the optimum pore size in the top layer to provide effective trapping of ink pigment particles near the surface. Dye-based printing systems known in the conventional art may benefit from a fixative or mordant in the top layer or layers of the receiver. Polyvalent metal ions and insoluble cationic polymeric latex particles provide effective mordants for anionic dyes. Both pigment and dye based printing systems are widely available. For the convenience of the user, a universal porous inkjet receiver known in the conventional art may comprise a dye fixative in the topmost layer or layers.

Although the recording elements disclosed herein have been referred to primarily as being useful for inkjet printers, they also can be used as recording media for pen plotter assemblies. Pen plotters operate by writing directly on the surface of a recording medium using a pen consisting of a bundle of capillary tubes in contact with an ink reservoir.

Another aspect of the invention relates to an inkjet printing method comprising the steps of: (a) providing an inkjet printer that is responsive to digital data signals; (b) loading the inkjet printer with the inkjet recording element described above; (c) loading the inkjet printer with a pigmented inkjet ink; and (d) printing on the inkjet recording element using the inkjet ink in response to the digital data signals.

Yet another aspect of the invention relates to a packaged product set comprising the inkjet receiver of the present invention in combination with an inkjet ink set comprising at least three colored ink compositions, for example, cyan, yellow, and magenta. Such a product set can conveniently be made commercially available to customers for use in printing photo-quality images, so that the ink compositions and the inkjet receiver are desirably matched during printing of images. The inkjet recording element of the present invention can further be characterized by the presence, on the backside thereof, of indicia that are capable of being detected by an inkjet printer. Such indicia can be detected by an optical detector or other such means in order to further improve the desired result by ensuring the recommended printer settings for a particular inkjet receiver are used when printing an image. This system allows the user to achieve higher print quality more conveniently.

In a preferred embodiment, the inkjet ink composition is applied onto the inkjet recording element at a rate of at least $5.0 \times 10^{-4}$ mL/cm$^2$/sec without loss of image quality. This ink flux corresponds to printing a photograph at an addressable resolution of 1200 by 1200 pixels per inch with an average ink volume of 10.35 picoliters (pL) per pixel in 42 seconds, wherein the printing of a given pixel by multiple coating passes is complete in less than 4 seconds.

The following examples further illustrate the invention.

EXAMPLES

Inventive Example 1

A coating dispersion was prepared by blending 23 g of Ludox TM® (50% colloidal silica, W.R. Grace) with 10.99 g of 9.1% Gohsenol KH-20® (polyvinyl alcohol, 80% hydrolysis, Nippon Gohsei), 2.5 g of a 5% solution of APG-325N® (Henkel Corp.) 5 g of a 5% solution of Zonyl FS-300® (DuPont) and 8.51 g demineralized water. The general procedure for preparing these coating dispersion examples was to add the diluent water and non-fluorine-containing surfactant to the silica dispersion prior to adding the polyvinyl alcohol binder solution. The fluorosurfactant-containing solution was always the last ingredient added. The dispersions were stirred at room temperature for at least 30 minutes prior to performing fresh viscosity measurements and were aged by storing them at room temperature without stirring.

Inventive Example 2

A coating dispersion was prepared by blending 28.75 g of Nalco 2329® (40% colloidal silica, Nalco) with 10.99 g of 9.1% Gohsenol KH-20® (80% hydrolysis polyvinyl alcohol, Nippon Gohsei), 2.5 g of a 5% solution of APG-325N® (Henkel Corp.), 5 g of a 5% solution of Zonyl FS-300® (DuPont) and 2.76 g demineralized water.

Inventive Example 3

A coating dispersion was prepared by blending 28.75 g of Sylojet 4000A® (40% colloidal silica, W.R. Grace) with 10.99 g of 9.1% Gohsenol KH-20® (80% hydrolysis polyvinyl alcohol, Nippon Gohsei), 2.5 g of a 5% solution of APG-325N® (Henkel Corp.), 5 g of a 5% solution of Zonyl FS-300® (DuPont) and 2.76 g demineralized water.

Inventive Example 4

A coating dispersion was prepared by blending 23 g of Ludox TM® (50% colloidal silica, W.R. Grace) with 10.99 g of 9.1% Gohsenol KH-20® (80% hydrolysis, polyvinyl alcohol, Nippon Gohsei), 1.25 g of a 10% solution of Surfactant 10G® (Dixie Corp.) 5 g of a 5% solution of Zonyl FS-300® (DuPont) and 9.76 g demineralized water.

Comparative Example 1

A coating dispersion was prepared by blending 23 g of Ludox TM® (50% colloidal silica, W.R. Grace) with 10.99 g of 9.1% Gohsenol KH-20® (80% hydrolysis, polyvinyl alcohol, Nippon Gohsei), 5 g of a 5% solution of Zonyl FS-300® (DuPont) and 13.51 g demineralized water.

Comparative Example 2

A coating dispersion was prepared by blending 28.75 g of Nalco 2329® (40% colloidal silica, Nalco) with 10.99 g of 9.1% Gohsenol KH-20® (80% hydrolysis, polyvinyl alcohol, Nippon Gohsei), 5 g of a 5% solution of Zonyl FS-300® (DuPont) and 7.76 g demineralized water.

Comparative Example 3

A coating dispersion was prepared by blending 28.75 g of Sylojet 4000A® (40% colloidal silica, W.R. Grace) with 10.99 g of 9.1% Gohsenol KH-20® (80% hydrolysis polyvinyl alcohol, Nippon Gohsei), 5 g of a 5% solution of Zonyl FS-300® (DuPont) and 7.76 g demineralized water.

Comparative Example 4

A coating dispersion was prepared by blending 23 g of Ludox TM® (50% colloidal silica, W.R. Grace) with 10.99 g of 9.1% Gohsenol KH-20® (80% hydrolysis polyvinyl alcohol, Nippon Gohsei), 2.5 g of a 5% solution of Tergitol 15-S-3® (Dow Corp.) 5 g of a 5% solution of Zonyl FS-300v (DuPont) and 8.51 g demineralized water.

Comparative Example 5

A coating dispersion was prepared by blending 23 g of Ludox TM®(50% colloidal silica, W.R. Grace) with 10.99 g of 9.1% Gohsenol KH-20® (80% hydrolysis polyvinyl alcohol, Nippon Gohsei), 2.5 g of a 5% solution of Tergitol 15-S-7® (Dow Corp.), 5 g of a 5% solution of Zonyl FS-300® (DuPont) and 8.51 g demineralized water.

Comparative Example 6

A coating dispersion was prepared by blending 23 g of Ludox TM® (50% colloidal silica, W.R. Grace) with 10.99 g of 9.1% Gohsenol KH-20® (80% hydrolysis, polyvinyl alcohol, Nippon Gohsei), 2.5 g of a 5% solution of Tergitol TMN-3® (Dow Corp.), 5 g of a 5% solution of Zonyl FS-300® (DuPont) and 8.51 g demineralized water.

Viscosities were measured at 25° C. using a Brookfield Viscometer Model DV with a number 18 spindle at 25° C. and are tabulated below in Table 1.

TABLE 1

| Example | Colloidal Silica | Cosurfactant | Cosurfactant Hydroxyl Number | Viscosity Fresh | Viscosity 24 hrs |
| --- | --- | --- | --- | --- | --- |
| IE-1 | Ludox ® TM | 1% APG-325N ® | 801 | 105 | 322 |
| IE-2 | Nalco 2329 ® | 1% APG-325N ® | 801 | 177 | 193 |
| IE-3 | Sylojet 4000A ® | 1% APG-325N ® | 801 | 69 | 115 |
| IE-4 | Ludox ® TM | 1% Surfactant 10G ® | 642 | 188 | 477 |
| CE-1 | Ludox ® TM | None | N/A | 210 | >3000 |
| CE-2 | Nalco 2329 ® | None | N/A | 358 | 338 |
| CE-3 | Sylojet 4000A ® | None | N/A | 155 | 301 |
| CE-4 | Ludox TM ® | 1% Tergitol 15-S-3 ® | 171 | 150 | >3000 |
| CE-5 | Ludox TM | 1% Tergitol 15-S-® 7 | 110 | 490 | >3000 |
| CE-6 | Ludox TM | 1% Tergitol TMN-3 ® | 181 | 122 | >3000 |

These results show that without a cosurfactant or with a low Hydroxyl Number cosurfactant the colloidal silica dispersions viscosity significantly in 24 hrs. For instance IE-1 is less viscous after 24 hours than CE-1, CE-4, CE-5, and CE-6. Likewise IE-2 is less viscous than CE-2, IE-3 is less viscous than CE-3 and IE-4 is less viscous after 24 hours than CE-1, CE-4, CE-5, and CE-6.

Inventive Example 5

A coating dispersion was prepared by blending 68.7 g of Aerodisp W7520N® (Fumed Silica Dispersion, Degussa) 20.6 g of 10% solution of Gohsenol KH-20® solution, 1.37 g of a 10% solution of Surfactant 10G®, and 5.48 g of a 5% solution of Zonyl FS-300®. The general procedure for preparing these coating dispersion examples was to add the diluent water and non-fluorine-containing surfactant to the silica dispersion prior to adding the polyvinyl alcohol binder solution. The fluorosurfactant-containing solution was always the last ingredient added. The dispersions were stirred at room temperature for at least 30 minutes prior to performing fresh viscosity measurements and were aged by storing them at room temperature without stirring.

Inventive Example 6

A coating dispersion was prepared by blending 68.7 g of Aerodisp W7520N® (Fumed Silica Dispersion, Degussa) 20.6 g of 10% solution of Gohsenol KH-20® solution, 2.74 g of a 5% solution of APG-325N®, and 5.48 g of a 5% solution of Zonyl FS-300®.

Comparative Example 7

A coating dispersion was prepared by blending 68.7 g of Aerodisp W7520N® (Fumed Silica Dispersion, Degussa) 20.6 g of 10% solution of Gohsenol KH-20® solution, and 5.48 g of a 5% solution of Zonyl FS-300®.

Comparative Example 8

A coating dispersion was prepared by blending 68.7 g of Aerodisp W7520N® (Fumed Silica Dispersion, Degussa) 20.6 g of 10% solution of Gohsenol KH-20® solution, 1.37 g of a 10% solution of Triton X-100® (Rohm and Haas), and 5.48 g of a 5% solution of Zonyl FS-300®.

Inventive Example 7

A coating dispersion was prepared by blending 45.3 g of Aerodisp W7520N® (Fumed Silica Dispersion, Degussa) 13.6 g of 10% solution of Gohsenol KH-20® solution, 0.9 g of a 10% solution of Surfactant 10G®, and 1.81 g of a 5% solution of Zonyl FSO®.

Comparative Example 9

A coating dispersion was prepared by blending 45.3 g of Aerodisp W7520N® (Fumed Silica Dispersion, Degussa) 13.6 g of 10% solution of Gohsenol KH-20® solution, and 1.8 g of a 5% solution of Zonyl FSO®.

Inventive Example 8

A coating dispersion was prepared by blending 45.3 g of Aerodisp W7520N® (Fumed Silica Dispersion, Degussa) 13.6 g of 10% solution of Gohsenol KH-20® solution, 0.9 g of a 10% solution of Surfactant 10G®, and 1.81 g of a 5% solution of Zonyl FSN®.

Comparative Example 10

A coating dispersion was prepared by blending 45.3 g of Aerodisp W7520N® (Fumed Silica Dispersion, Degussa) 13.6 g of 10% solution of Gohsenol KH-20® solution, and 1.81 g of a 5% solution of Zonyl FSN®.

Viscosities were measured after the dispersions were made and then after 48 hours. Viscosities were measured at 25° C. using a Brookfield Viscometer Model DV with a number 18 spindle at 25° C. The experimental results are tabulated in Table 2 below.

TABLE 2

| Example | Fumed Silica | Fluorosurfactant | Cosurfactant | Cosurfactant Hydroxyl Number | Viscosity cP (Fresh) | Viscosity cP (48 hrs) |
| --- | --- | --- | --- | --- | --- | --- |
| IE-5 | Yes | 1% Zonyl FS-300 ® | 1% Surfactant 10G ® | 642 | 51 | 175 |
| IE-6 | Yes | 1% Zonyl FS-300 ® | 1% APG-325N ® | 801 | 43 | 103 |
| CE-7 | Yes | 1% Zonyl FS-300 ® | None | N/A | 50 | >300 |
| CE-8 | Yes | 1% Zonyl FS-300 ® | 1% Triton X-100 ® | 90 | 56 | >300 |
| IE-7 | Yes | 1% Zonyl FSO ® | 1% Surfactant 10G ® | 642 | 69 | 78 |
| CE-9 | Yes | 1% Zonyl FSO ® | None | N/A | 59 | 116 |
| IE-8 | Yes | 1% Zonyl FSN ® | 1% Surfactant 10G ® | 642 | 49 | 100 |
| CE-10 | Yes | 1% Zonyl FSN ® | None | N/A | 51 | 254 |

These results show that without a cosurfactant or with a low Hydroxyl Number cosurfactant, the fumed silica dispersions viscosify significantly in 24 hrs. For instance, IE-5 and IE-6 are less viscous after 24 hours than CE-7 and CE-8. Likewise, IE-7 is less viscous than CE-9, and IE-8 is less viscous than CE-10.

Inventive Example 9

A support comprising a paper with polyethylene resin coating on both sides was treated on one side by coating with an aqueous composition comprising a water dispersible polyester ionomer (Eastman AQ38®), and sodium tetraborate in a ratio of 1:1 at total solids of 0.6% and dried to provide a dry coverage of 0.29 g/m².

A first aqueous coating composition (17.9% solids) for a base layer comprised a dispersion (DEGUSSA W7520®) containing anionic fumed silica (AEROSIL 200®), 8% PVA (NIPPON GOHSEI KH-20®), 0.8% (1,4-dioxane-2,3-diol (DHD)), 2.0% fluorosurfactant (ZONYL FS300®), 1.0% Surfactant 10G®. A second aqueous coating composition (10% solids) for a gloss layer comprises a dispersion of

Inventive Example 16

Inventive Sample I-16 was prepared like Sample I-9 except only co-surfactant APG-325N® was used in the base layer.

The coating samples were evaluated for unprinted gloss using a Gardner glossmeter, and the viscosities of the coating dispersions were observed after six days. The results are tabulated below.

TABLE 3

| | Base | | | Top | | | |
|---|---|---|---|---|---|---|---|
| Sample | Fluorosurfactant FS-300 ® | Cosurfactant at 1% | Viscosity After 6 Days | Fluorosurfactant FS-300 ® | Co-surfactant at 1% | Viscosity After 6 Days | 20 Degree Gloss |
| I-9 | 2% | Surfactant 10G ® | Low | 2% | Surfactant 10G ® | Low | 34 |
| I-10 | 2% | APG-325N ® | Low | 2% | Surfactant 10G ® | Low | 33 |
| I-11 | 2% | Surfactant 10G ® | Low | None | None | Low | 4 |
| I-12 | 2% | Surfactant 10G ® | Low | None | Surfactant 10G ® | Low | 5 |
| I-13 | 2% | Surfactant 10G ® | Low | 2% | None | Very High | 34 |
| I-14 | 2% | None | Very High | 2% | Surfactant 10G ® | Low | 34 |
| I-15 | None | Surfactant 10G ® | Low | 2% | Surfactant 10G ® | Low | 11 |
| I-16 | None | APG-325N ® | Low | 2% | Surfactant 10G ® | Low | 7 | anionic colloidal silica (1:1 mixture of Grace Davison SYLO-JET 4000A® and LUDOX TM-50), 8% PVA (NIPPON GOHSEI KH-20(E) a crosslinker (0.8% 1,4-dioxane-2,3-diol (DHD), a coating aid (2% ZONYL FS300), and a cosurfactant (1% Surfactant 10G®). The first and second aqueous coating compositions were simultaneously coated on the subbing layer to provide layers of dry weight 21.5 g/m² and 2.7 g/m², respectively, and dried to form inventive Sample I-1.

Inventive Example 10

Inventive Sample I-10 was prepared like I-9 except APG-325N® surfactant was used as the cosurfactant in the base layer.

Inventive Example 11

Inventive Sample I-11 was prepared like Sample I-9 except no fluorosurfactant or cosurfactant was used in the gloss layer.

Inventive Example 12

Inventive Sample I-12 was prepared like Sample I-9 except only cosurfactant was used in the gloss layer.

Inventive Example 13

Inventive Sample I-13 was prepared like Sample I-9 except only fluorosurfactant was used in the gloss layer.

Inventive Example 14

Inventive Sample I-14 was prepared like Sample I-9 except only fluorosurfactant was used in the base layer.

Inventive Example 15

Inventive Sample I-15 was prepared like Sample I-(except only cosurfactant 10G® was used in the base layer.

Inventive Samples I-9 and I-10 show that high gloss coatings can be obtained with dispersions that have excellent stability to increase in viscosity. Inventive Samples I-11 and I-12 demonstrate that a high gloss coating is not achieved without fluorosurfactant in the gloss layer. Inventive Samples I-13 and I-14 demonstrate that high gloss can be achieved without cosurfactant, but the coating dispersion that does not contain cosurfactant will become thick with time. Inventive Samples I-15 and I-16 demonstrate that without fluorosurfactant in the base layer a high gloss coating is not achieved.

The invention claimed is:

1. A coating composition comprising a dispersion of fine particles of silica having a particle size of less than 300 nm, hydrophilic hydroxy-containing polymer, a first non-ionic surfactant comprising a perfluoroalkyl-containing alcohol comprising ethylene oxide repeat units, and a second non-ionic surfactant selected from the group consisting of non-fluorine-containing surfactants that comprises a hydrophobic moiety and a hydrophilic moiety comprising hydroxy groups, wherein the hydroxy number of the second non-ionic surfactant is greater than 300.

2. The coating composition of claim 1, wherein said fluorosurfactant is a linear molecule represented by the following structure:

wherein x is on average between 0 and 25.

3. The coating composition of claim 1, wherein said a first non-ionic surfactant comprises between 0.05% and 3% of solids in the coating composition by weight and wherein said second non-ionic surfactant comprises between 0.05% and 3% of solids in the coating composition by weight.

4. The coating composition of claim 1, wherein the non-fluorine-containing non-ionic surfactant is represented by the following structure:

wherein $R_1$ is a hydrophobic organic group having 6 to 24 carbons; M is a repeat unit with at least one hydroxyl group; and $R_2$ is hydrogen or an end group for the repeat units, and n is on average between 1 and 20.

5. The coating composition of claim 4, wherein $R_1$ is a substituted or unsubstituted alkyl, aryl, alkylaryl having 8 to 20 carbons; M is a monomeric repeat unit of a glycidol, oligomeric polyglycidyl, or carbohydrate; $R_2$ is hydrogen, and n is on average between about 1 and 10.

6. The coating composition of claim 4, wherein $R_1$ is a hydrocarbon with 8 to 20 carbons optionally containing an ether linking group.

7. The coating composition of claim 1, wherein the second non-ionic surfactant comprises a reaction product of a mixture comprising glycidol, glucose, glucoside, or oligomeric polyglycidyl.

8. The coating composition of claim 1, wherein the hydrophobic moiety of the second non-ionic surfactant comprises an alkylphenoxy tail having 12 to 20 carbon atoms; and the hydrophilic moiety comprises a hydrophilic tail comprising at least five repeat units each with at least one hydroxyl group.

9. The coating composition of claim 1, wherein the second non-ionic surfactant is represented by the following structure:

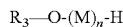

$$R_3\text{—}O\text{-}(M)_n\text{-}H$$

wherein $R_3$ is a hydrophobic substituted or unsubstituted alkyl or alkylaryl group with 8 to 20 carbons; n is on average between about 1 and 20; and M is an alkylene group containing at least one hydroxyl group.

10. The coating composition of claim 9, wherein n is on average from 5 to 15, and M is a repeat unit of glycidol.

11. The coating composition of claim 9, wherein the second non-ionic surfactant is represented by the following structure:

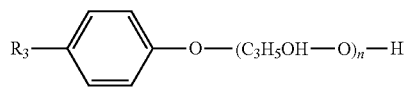

wherein n and $R_3$ are as defined above.

12. The coating composition of claim 1, wherein the second surfactant is a polyglycoside comprising the following structure:

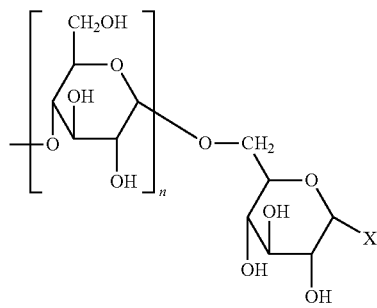

wherein n is on average 0 to 3 carbohydrate units, and X represents $R_4$, $OR_4$, $SR_4$, or $N(R_4)(R_5)$, wherein $R_4$ is a substituted or unsubstituted hydrophobic organic moiety containing one or more functional groups selected from the group consisting of carboxamide, ketone, sulfone, sulfoxide, sulfonamide, urea, phosphate ester, carboxylic ester, or a branched and unbranched alkyl, aryl, alkenyl, carbocyclic, or heterocyclic group; and $R_5$ is selected from the group consisting of a hydrogen atom or independently an $R^4$ group.

13. The coating composition of claim 12, wherein X represents a group $OR_4$ and hydrogen terminates the carbohydrate repeat units.

14. The coating composition of claim 12, wherein $R_4$ is a linear alkyl chain with an average length comprising from 8 or more carbons.

15. The coating composition of claim 12, wherein the number of carbons in $R_4$ is from 8 to 16 and n is 0 to 2.

16. The coating composition of claim 1, wherein the second surfactant is an alkyl polyglycoside represented by the following structure:

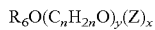

$$R_6O(C_nH_{2n}O)_y(Z)_x$$

wherein $R_6$ is a hydrophobic organic group containing from about 6 to 30 carbon atoms; n is a number from 2 to 4; y is a number having an average value of from 0 to about 12; Z is a moiety derived from a reducing saccharide containing 5 or 6 carbon atoms; and x is a number having an average value of from 1 to about 10, except that mixtures of saccharide moieties Z may be incorporated into the alkyl polyglycoside, normally free hydroxyl groups of the saccharide moiety may be alkoxylated or polyalkoxylated, and the structure may optionally include ethylene oxide and propylene oxide in random or block combinations.

17. The coating composition of claim 1, wherein the silica comprises fumed silica, colloidal silica, or mixtures thereof.

18. The coating composition of claim 17, wherein the fumed silica has a primary particle size of 5 to 20 nm and colloidal silica has a primary particle size of 10 to 300 nm.

19. The coating composition of claim 1, wherein the hydrophilic hydroxy-containing polymer is poly(vinyl alcohol).

20. An inkjet recording element made with a coating composition of claim 1.

21. The inkjet recording element of claim 20, wherein at least an uppermost gloss layer of the inkjet recording element is made with said coating composition and the inkjet recording element is characterized by a 20-degree gloss of greater than 25.

22. The inkjet recording element of claim 20, wherein said coating composition comprises colloidal silica particles have a median diameter of between 10 and 300 nm, the hydrophilic hydroxy-containing polymeric binder is poly(vinyl alcohol) having a percent hydrolysis of 75 to 90 and a viscosity for a 4% aqueous solution at 20° C. of at least 25 cps, and the hydrophilic hydroxyl-containing polymer is the primary binder crosslinked with crosslinker comprising a boron-containing compound.

* * * * *